June 5, 1923.
T. ZWEIGBERGK
1,457,920
ELECTRIC MOTOR CONTROL SYSTEM
Filed Aug. 20, 1921
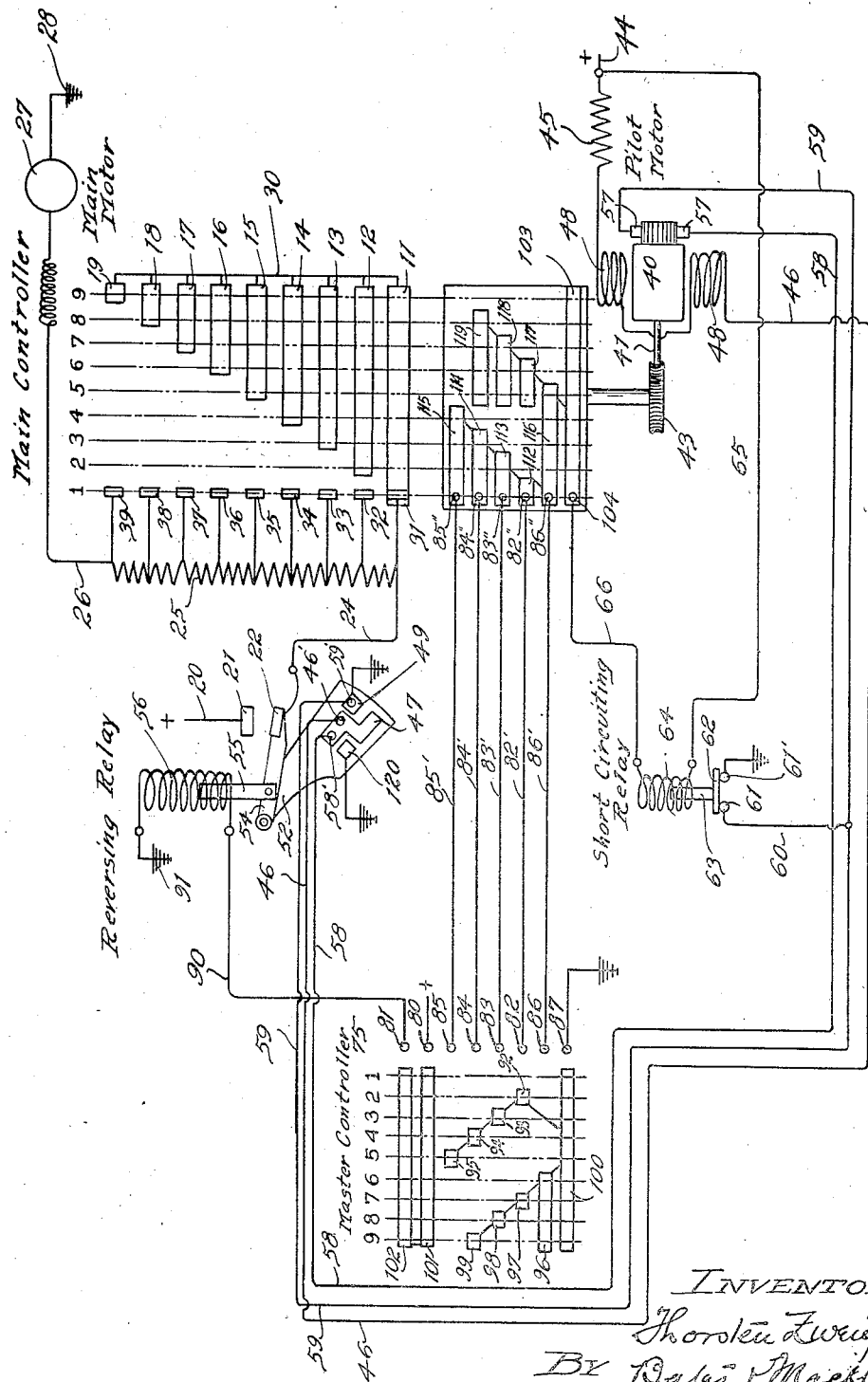
INVENTOR
Thorsten Zweigbergk,
BY Bauer & Macklin,
ATTORNEYS Patented June 5, 1923.

1,457,920

UNITED STATES PATENT OFFICE.

THORSTEN ZWEIGBERGK, OF LONDON, ENGLAND.

ELECTRIC-MOTOR CONTROL SYSTEM.

Application filed August 20, 1921. Serial No. 493,855.

*To all whom it may concern:*

Be it known that I, THORSTEN ZWEIG-BERGK, a citizen of the United States, residing at London, in the county of London, England, have invented a certain new and useful Improvement in Electric-Motor Control Systems, of which the following is a full, clear, and exact description, reference being had to the accompanying drawings.

This invention relates to an electric controlling system wherein an electrically driven controller is actuated through a manually operated master controller.

The essential object of the invention is to provide a simplified form of such a system which shall be effective in operation and by which the remote control of a comparatively heavy current may be readily accomplished.

More specifically, my device comprises an improved and simplified arrangement accomplishing the results attained by the arrangement shown, described and claimed in my Patent No. 1,412,589, April 11, 1922.

By my invention as herein disclosed the main controller may be positioned by the master controller in a certain position corresponding to the position of the master controller, by the use of a single solenoid switch instead of by the use of a plurality of switches as in the before mentioned application. This results in a great simplification of the circuits necessary to bring about the result and each wire from one controller to the other may be utilized in two or more positions of the controllers.

The essential characteristics of the invention are summarized in the claims.

The drawing comprises a diagrammatic illustration of a preferred arrangement embodying my invention, and the following description refers to the drawing by reference characters designating the various elements of the system.

The controller which I designate herein as the "main" controller, is illustrated as comprising a drum carrying a plurality of main contact plates, 11 to 19, inclusive, while the broken lines 1 to 9, inclusive, parallel with the axis of the drum correspond to the various positions of the controller.

At 20 is indicated the main power wire carrying the current it is desired to regulate by the main controller. This wire leads current to the contact 21 with which a contact 22 is adapted to co-act. From contact 22, the current passes through a wire 24 to resistance 25, to which are connected the contacts 31 to 39, inclusive. From the resistance 25, wire 26 leads through the field and armature windings of the main motor 27 and to the ground as indicated at 28.

As the contact plates 11 to 19 are brought successively under the contacts 31 to 39 respectively, it will be seen that resistance in the main motor circuit will be progressively cut out since the contact plates 11 to 19 are electrically connected by wire 30, and the contacts 31 to 39, inclusive, are connected to different parts of resistance 25 in a usual manner.

Moving with the main controller, and for convenience shown as mounted on the same drum, are auxiliary contacts 103, and 112 to 119, inclusive, which co-operate with the manually operated master controller to govern a relay in the operation of the system and thereby govern the operation of a pilot motor which sets the main controller in positions determined by the position of the master controller, as will be hereafter more fully described.

The main controller drum is illustrated as rotated by a pilot or auxiliary motor 40 whose armature shaft 41 may carry a worm co-acting with the worm gear 43 on the shaft of the main controller drum. The circuit through the motor 40 proceeds from a power wire 44 through the usual resistance 45, the field coils 48, wire 46, stationary contact 46', contact plate 47, stationary contact 58', wire 58, the armature brushes 57, and armature, the wire 59, the stationary contact 59', to the grounded contact plate 49 when the parts are in the position illustrated. An arm 52 is shown as rigidly attached to the arm 54 carrying the contact 22, and having a core 55 within the solenoid coil 56 to actuate the contact 22, as well as move the arm 52. This arm 52 carries the contact plates 47 and 49 just above mentioned, as well as the contact plate 120 which will be subsequently referred to. The contact plates 120 and 49 are suitably grounded as shown. The solenoid 56 may thus be designated as a reversing relay as the position of arm 54 determines the direction of rotation of the pilot motor 40.

The contact plates 49 and 120 are connected to the ground. The contact plates 47, 49 and 120 are on the arm 52 and move therewith, the arrangement being such that in the lower position of this arm (which is the position shown in the drawings), the wires 46 and 58 are connected by means of their contact 46', 58' and the plate 47, while the wire 59 is grounded through the contact plate 49, contact plate 120 being inoperative in this position of the arm. In the upper position of the arm, wire 58 is grounded through contact 58', and contact plate 120, and the wires 46 and 59 are connected by means of their contacts 46' and 59', and the contact plate 47, contact plate 49 being inoperative in this position of the arm.

The wire 59 is connected to a wire 60 carrying the contact 61 adapted to be connected by the bridging member 62 of the solenoid core 63, to grounded contact 61', whereby the wire 59 is grounded when the bridge member 62 is in its lower position, so that this solenoid constitutes a short circuiting relay.

The master controller is diagrammatically indicated at 75 and may conveniently take the form of a rotatable drum carrying a series of contact plates which are adapted to be brought into electric connection with stationary contact points 80 to 86 inclusive, and the grounded contact 87.

The contact plates on the master controller drum consist of the selective series of contact plates 92, to 99, inclusive, which are all connected with the plate 100. The upper portion of the drum is shown as provided with contact plates 101, 102, which are connected together. Plates 92 to 96, inclusive, co-act with the stationary contact plates 82 to 86, inclusive, in the various positions to which the main controller drum may be moved, the positions being indicated by the broken lines 1 to 9, inclusive. When the master controller 75 is placed in any one of these positions, the connections are such as to cause the main controller to be brought to the correspondingly numbered position to thereby determine the resistance placed in circuit with the main motor 27. The contact plates 101 and 102 are electrically connected and extend through all of the positions 1 to 9, so as to close the circuit from the power wire connected to the contact 80, through contact 81, wire 90, solenoid coil 56 and the ground at 91, so that in any one of these positions of the master controller, the solenoid circuit through 56 is closed and the core 55 is drawn upward to close contact between points 21 and 22 and send a current through the main motor circuit.

The stationary contacts 82 to 86, inclusive, are respectively connected by means of the wires 82' to 86', inclusive, with stationary contacts 82" to 86", inclusive, respectively, which are adapted to co-operate with the series of selective contact plates mounted on the drum of the main controller. The series of contact plates on this drum are all connected to the single plate 103 which extends through all of the positions of the drum, so as to be always connected with the stationary contact 104 connected by wire 66 to the solenoid coil 64, connected to the wire 65 in turn connected to power wire 44.

The series of contact plates on the main controller designated 112 to 119, inclusive, co-operate with the plates 92 to 99, inclusive, to bring the main controller into a position corresponding to the position occupied by the master controller.

The specific arrangement of the contact plates whereby the above result is brought about is as follows: The contacts 92, 93, 94, and 95, each occupy positions 2, 3, 4, and 5, respectively on the drum, so that the wires 82' to 85', inclusive, are connected to these plates respectively only in a single position of the master controller. The corresponding plates 112 to 115, inclusive, on the main controller, however, each occupy position 1, and are progressively longer, so that 112 occupies position 1; 113, positions 1 and 2; 114, positions 1, 2, 3; etc. The contact 96 on the master controller, however, may be termed a "bridging" contact and it occupies a position beginning with position 6, which marks the beginning of the second series. The corresponding bridging contact 116 on the main controller extends from position 1, through 6, so that it serves to move the main controller into position to operate the second series of contacts, as shown comprising 97, 98, and 99, on the master controller, and 117, 118, and 119, on the main controller. It will be seen that contacts 96, and 116, serve two functions, that is, they serve to bridge over from one set to the other, and they serve as positioning means to stop the main controller at the first position of the second series, namely, position 6, when the master controller is stopped at position 6. Each of these contacts 117, 118, 119, are arranged in a progressive manner similar to the arrangement of 112, 113, 114, except that they begin at position 5. Each of the contacts 97, 98, 99, occupy a single position.

The operation of the system is as follows:
In the position shown in the drawings, the master controller 75 is in off position and the main controller is in its first position. When the master controller is moved to position 1, the current will pass from the contact 80 through contacts 101, 102, 81 wire 90, solenoid coil 56, and ground 91, whereupon the solenoid core 55 of the reversing relay will be drawn upward and the circuit of the main motor will be closed at points 21, 22. The circuit through this motor will be from power wire 20, contacts 21, 22, wire 24, resistance 25, wire 26, main motor 27 to ground 28, none of the resistance being cut out. This initial position of the master controller will not alter the position of the main controller which will remain in position 1.

When, however, the master controller is moved to position 2, the current through the solenoid 56 will continue as before and the current through the main motor 27 will continue as before, but a current will flow from power wire 44 through resistance 45, field windings 48 of pilot motor 40, wire 46, contact 46′ plate 47, contact 59′, wire 59, armature brushes 57, and armature wire 58, contact 58′, contact 120 to ground.

The wire 59 is not grounded by means of the wire 60 at this time, because the bridge member 62 carried by the core 63 will be lifted by the solenoid 64. The current through this solenoid will proceed from power wire 44 through the wire 65, coil 64, contact 104, contact plate 103, contact plate 112, contact 82″, wire 82′, contact 82, contact plate 92, contact plate 100, contact 87 to ground. This circuit will be maintained until the plate 112 is turned to such a point as to break the connection between the contact 82″ and contact plate 112. This takes place when the drum of the main controller reaches second position. As soon as the drum reaches second position, the circuit just mentioned is broken and the core 63 drops, thereby short circuiting the armature of the motor 40. The first section of the resistance in the main motor circuit is now cut out of circuit. A similar state of affairs occurs when the master controller is brought to third position, except that the current through the solenoid 64 passes along contacts 83, etc., and the circuit is now broken when the main controller reaches position 3.

It should be noted also that the arrangement of the bridging contacts 96 and 116 is such that if the master controller is immediately turned to one of the positions in the second set, namely to positions 6, 7, 8, or 9, the circuit through the solenoid 64 will be maintained until the main controller reaches the position corresponding to that occupied by the master controller. Thus, suppose the master controller to be moved from the position shown in the drawing to position 8, for instance, then the current will be maintained through the solenoid 64 as follows: from power wire 44, wire 65, solenoid 64, wire 66, plate 103, plate 116, wire 86′ plate 96, plate 100, contact 87 to ground. And this circuit will be continued until after position 5 is reached by the main controller. In fact the circuit will continue until the main controller reaches position 6. However, as soon as position 5 is reached by the main controller there will also be the following circuit: power wire 44, wire 65, solenoid 64, wire 66, plate 103, contact 118, wire 83′, contact plate 98, contact plate 100, and contact 87 to ground, so that the solenoid current will be broken only when the main controller reaches position 8.

It will be apparent a third series of contacts might be provided by using a second pair of bridging contacts on the master and main controller, and that such arrangement might be continued indefinitely.

It will be seen that when the master controller is again brought to off position, since the arm 52 is lowered the current through the field windings of the motor 40 will be maintained as before while the current through the armature will be in the reverse direction so that the motor will proceed to turn the drum of the main controller backward to first position at which suitable holding means may be provided. The circuit actuating this motor when arm 52 is in this lowered position may be traced as follows: from the power wire 44, through resistance 45, field coils 48, wire 46, contact 46′, contact plate 47, contact 58′, wire 58, through the brushes 57, and the armature, to wire 59, contact 59′, contact plate 49 to the ground. It will be noticed that in this position, it is immaterial whether the solenoid 63 is up or down, because if the solenoid should be up, the circuits would be as already traced, whereas, if the solenoid were in the down position, which it would normally occupy, the wire 59 would be grounded in the manner just indicated, and would also be grounded by means of the wire 60, contact 61, bridge 62, contact 61′ to ground.

It will be seen that I have provided an arrangement whereby the main controller for progressively removing resistance from a motor circuit may be given the position of the master controller by means of a series of selective contacts on the controllers and by the use of a single current operated switch, whereby resistance may be progressively cut out of the circuit of the main motor.

I may, if it is deemed desirable, also employ a "no-voltage" release arrangement such as is shown in my Patent No. 1,412,589, referred to above, whereby if the circuit through the main motor is broken at any time, it cannot be renewed until the main controller has been returned to its initial position. As such an arrangement could be brought about in the same manner as shown in my application above referred to, I do not consider it necessary to illustrate the arrangement herein.

While I have described a specific form in which the principles of my invention may be embodied, it is apparent that many changes might be made therein, within the scope of my invention and the foregoing description should be understood to be illustrative of a particular embodiment of my invention rather than as restrictive of its character and scope.

Having thus described my invention, I claim:

1. The combination of a controller, an auxiliary motor for actuating the controller, a master controller, a plurality of means moved with the controller and a relay successively operated by said means to control said auxiliary motor through connections on the master controller.

2. The combination of a controller, an auxiliary motor for actuating the controller, a plurality of means moved with the controller and a short circuiting relay successively operated by said means to control said auxiliary motor.

3. The combination of a controller, an auxiliary motor for actuating the controller, means for short circuiting said auxiliary motor to stop it, said means comprising a successively operated relay controlled by a plurality of contacts moved with the controller.

4. In a system of the class described, the combination of a motor in an open main circuit, and variable resistances, means for closing said circuit, a main controller adapted to successively vary said resistances, a motor for actuating said controller, a master controller, a series of auxiliary contacts moved with the main controller, and a single circuit switch selectively operated by said contacts for governing said auxiliary motor under control of said master controller and said auxiliary contacts.

5. The combination of a main controller, an auxiliary motor for operating the main controller, a master controller for governing the main motor circuit and auxiliary motor circuit, a series of contacts moved with the main controller and a relay controlled by said contacts and adapted to control the stopping and starting of the auxiliary motor at each successive position of the main controller.

6. The combination of a main controller, an auxiliary motor for operating the main controller, a master controller for governing the main motor circuit and auxiliary motor circuit, a series of contacts moved with the main controller and a relay for making and breaking a circuit controlling the stopping and starting of the auxiliary motor at each successive position of the main controller, and connections whereby the master controller closes a circuit to said main motor directly in the initial position of said main controller.

7. The combination of a main controller movable to successive positions, an auxiliary motor for moving the main controller, a master controller for governing said main motor circuit and said auxiliary motor, a relay for short circuiting the armature of said auxiliary motor consequent upon the main controller reaching a position corresponding to that of the master controller.

8. In combination, a motor and resistances in circuit therewith, a main controller for cutting out said resistances in a series of successive positions, an auxiliary motor for actuating said main controller, a circuit therefor, a master controller governing said circuit and the circuit of the main motor, means whereby first and each successive position of the master controller may close the circuit through the main motor, a series of auxiliary contacts movable with the main controller, a relay governed by the master controller and said contacts for successively controlling the circuit of the auxiliary motor to stop it in each successive position of the main controller, and means for reversing said auxiliary motor consequent upon breaking of the circuit through the main motor.

9. In a system of the class described, the combination of a motor in an open main circuit, a variable resistance means for closing said circuit, a main controller adapted to successively vary said resistance, an auxiliary motor for actuating said controller, a master controller, a series of auxiliary contacts moved with the main controller, and a circuit making and breaking device for governing said auxiliary motor under control of said master controller and said auxiliary contacts, and means actuated by the main circuit closing means to reverse the motor under control of the contacts by the main controller.

10. The combination of a main controller, an auxiliary motor for actuating the controller, a master controller, a series of selective contacts on the master controller, a series of selective contacts on the main controller, the contacts on each controller being connected together, means for selectively connecting the contacts on the two controllers in various positions of the controllers, a solenoid coil, and a connection whereby a circuit is formed through the solenoid coil when said contacts on the different controllers are connected, and means controlled by the solenoid coil for making and breaking the auxiliary motor circuit.

11. The combination of a main controller, an auxiliary motor for moving the main controller, a master controller, a series of selective contacts on the master controller, a series of selective contacts on the main controller, and connections therebetween when the master controller is brought to a position in advance of the position of the main controller a connection is effected between the contacts of the two controllers until the main controller reaches a corresponding position, a solenoid coil, a switch controlled thereby, said switch governing the circuit of the auxiliary motor, and a connection between the contacts of each controller and the wires of the solenoid circuit, whereby a circuit is closed through the solenoid coil when said contacts are connected.

12. The combination of a main controller, an auxiliary motor for actuating the controller, a master controller, a series of selective contacts on the master controller, a series of selective contacts on the main controller so arranged that when the master controller is brought to a position in advance of the position of the master controller a connection is effected between the contacts of the two controllers until the main controller reaches a corresponding position, a solenoid coil, a switch controlled thereby, said switch short circuiting the circuit of the pilot motor, when the solenoid is not energized, and a connection between the contacts of each controller and the wires of the solenoid circuit, whereby the circuit is formed through the solenoid coil when said contacts on the two controllers are connected.

13. The combination of a main controller a pilot motor for actuating the controller, a plurality of contacts on said controller connected to a solenoid coil, a master controller, a plurality of contacts thereon connected to the return line of said solenoid coil, a member actuated by said coil to start and stop the auxiliary motor, and means for connecting certain contacts on one controller to certain contacts on the other controller to complete said solenoid circuit in various positions of said controllers.

14. In an electrical controller system, two controllers, a set of progressively arranged contacts on the first controller, each occupying at least one position and each succeeding contact occupying a position not occupied by any of the preceding ones, a set of contacts on the other controller each extending through the same first position and progressively arranged so as to successively extend through the positions occupied by the preceding contacts and one additional position, a second set of contacts on each controller arranged similarly to the first set on each controller, bridging members between said sets on each controller extending respectively through the position of the second set on the first controller, and through the positions of the first series on the second controller respectively, means for connecting corresponding members in either series on one controller with those of the other controller where the respective controllers occupy positions corresponding to those of the corresponding contacts, and means for connecting the bridge members of the controllers when the respective controllers occupy positions corresponding to those occupied by their bridge members, whereby said contacts cause the second controller to be moved to correspond to the position to which the other controller has been moved.

15. In an electrical controller system, two controllers, means for positioning one controller by means of the other controller, said means comprising a plurality of sets of contacts on each controller, the contacts in each set being progressively arranged, bridging contacts respectively occupying all of the positions of the next succeeding set of contacts on one controller and corresponding bridging contacts each occupying all of the positions of the preceding sets of contacts on the other controller, connecting means for connecting the corresponding contacts on one controller with the corresponding contacts on the other controller when their respective controllers occupy positions corresponding to the positions of the contacts respectively, and means connecting all of said contacts on one controller with one wire of a circuit, and all of the contacts of the other controller with a return wire of said circuit.

16. In an electrical controller system, two controllers each having selective contacts progressively arranged thereon whereby when the first controller is moved to a position in advance of the position occupied by the second controller, these contacts on the different controllers are connected, a power wire connected to the contacts on one controller, a return wire connected to the contacts on the other controller, and means for moving the second controller, and a single switch controlling the movement of the controller moving means.

17. An electric controller system, a manually actuated master controller, and a motor driven main controller, a plurality of progressively arranged contacts on the first controller arranged in groups, each contact of each group being progressively positioned relative to the other, and each contact occupying a position on the controller not occupied by any of the other contacts, sets of contacts positioned on the main controller and progressively extending through additional positions corresponding to the positions of the individual contacts on the master controller, bridging members connecting the contacts in each set thereof, connections between the respective controllers whereby a circuit is established extending to a selected position of the master controller and initial and intermediate positions as well as a selected position of the main controller, and means associated with the master controller for connecting the auxiliary motor to a source of energy during the period the auxiliary motor is actuating the main controller to a selected position.

In testimony whereof, I hereunto affix my signature.

THORSTEN ZWEIGBERGK.